(12) United States Patent
Lange et al.

(10) Patent No.: US 12,032,874 B2
(45) Date of Patent: Jul. 9, 2024

(54) AUTOMATED ASSISTANT PERFORMANCE OF A NON-ASSISTANT APPLICATION OPERATION(S) IN RESPONSE TO A USER INPUT THAT CAN BE LIMITED TO A PARAMETER(S)

(71) Applicant: GOOGLE LLC, Mountain View, CA (US)

(72) Inventors: Joseph Lange, Zurich (CH); Marcin Nowak-Przygodzki, Bäch (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/366,172

(22) Filed: Aug. 7, 2023

(65) Prior Publication Data

US 2023/0385022 A1    Nov. 30, 2023

Related U.S. Application Data

(63) Continuation of application No. 17/233,223, filed on Apr. 16, 2021, now Pat. No. 11,720,325.

(51) Int. Cl.
*G10L 15/22* (2006.01)
*G06F 3/16* (2006.01)
*G10L 15/28* (2013.01)

(52) U.S. Cl.
CPC ............... *G06F 3/167* (2013.01); *G10L 15/22* (2013.01); *G10L 15/28* (2013.01); *G10L 2015/223* (2013.01)

(58) Field of Classification Search
CPC .......... G06F 3/167; G10L 15/28; G10L 15/22
See application file for complete search history.

(56) References Cited

U.S. PATENT DOCUMENTS 8,924,219 B1    12/2014   Bringert et al.
2009/0030698 A1    1/2009   Cerra et al.
(Continued)

FOREIGN PATENT DOCUMENTS

WO    2020219085 A1    10/2020
WO    2020226675 A1    11/2020

OTHER PUBLICATIONS

European Patent Office; International Search Report and Written Opinion of Application No. PCT/US2021/063633; 18 pages; dated Mar. 25, 2022.
(Continued)

*Primary Examiner* — Ibrahim Siddo
(74) *Attorney, Agent, or Firm* — Gray Ice Higdon

(57) ABSTRACT

Implementations set forth herein relate to an automated assistant that can provide a selectable action intent suggestion when a user is accessing a third party application that is controllable via the automated assistant. The action intent can be initialized by the user without explicitly invoking the automated assistant using, for example, an invocation phrase (e.g., "Assistant . . . "). Rather, the user can initialize performance of the corresponding action by identifying one or more action parameters. In some implementations, the selectable suggestion can indicate that a microphone is active for the user to provide a spoken utterance that identifies a parameter(s). When the action intent is initialized in response to the spoken utterance from the user, the automated assistant can control the third party application according to the action intent and any identified parameter(s).

17 Claims, 9 Drawing Sheets

(56) References Cited

U.S. PATENT DOCUMENTS

2018/0324115 A1* 11/2018 Aggarwal ............... G06F 40/10
2020/0395018 A1* 12/2020 Burakov ................. G10L 15/26

OTHER PUBLICATIONS

Statt et al., "Alexa will soon be able to launch Android and iOS apps using voice commands" The Verge. Dated Jul. 22, 2020. 3 pages. 2020.

* cited by examiner

AUTOMATED ASSISTANT PERFORMANCE OF A NON-ASSISTANT APPLICATION OPERATION(S) IN RESPONSE TO A USER INPUT THAT CAN BE LIMITED TO A PARAMETER(S)

BACKGROUND

Humans may engage in human-to-computer dialogs with interactive software applications referred to herein as "automated assistants" (also referred to as "digital agents," "chatbots," "interactive personal assistants," "intelligent personal assistants," "conversational agents," etc.). For example, humans (which when they interact with automated assistants may be referred to as "users") may provide commands and/or requests using spoken natural language input (i.e., utterances) which may in some cases be converted into text and then processed, and/or by providing textual (e.g., typed) natural language input.

In some instances, an automated assistant can offer a variety of features that can be initialized, even when a user is interacting with a separate application in a foreground of their computing device. For example, a user can utilize an automated assistant to perform a search within a separate foreground application. For instance, in response to a spoken utterance of "Search for Asian fusion", that is directed to an automated assistant while a separate restaurant review application is in the foreground, the automated assistant can interact with the foreground application (e.g., directly and/or via emulating user input(s)) to cause a search of "Asian fusion" to be submitted utilizing a search interface of the restaurant review application. Also, for instance, in response to a spoken utterance of "Add a calendar entry of patent meeting for 2:00 tomorrow", that is directed to an automated assistant while a separate calendar application is in the foreground, the automated assistant can interact with the foreground application to cause a calendar entry to be created that is for "tomorrow" at 2:00 and that is entitled "patent meeting".

However, in utilizing the automated assistant to interact with the foreground application, the user must specify, in the spoken utterance, both the intent (e.g., "search for" or "add a calendar entry" in the preceding examples) and parameter(s) for the intent (e.g., "Asian fusion" or "patent meeting for 2:00 tomorrow"). Also, in some situations the user may have to provide a spoken invocation phrase for the automated assistant, or other automated assistant invocation input(s) before providing the spoken utterance.

Moreover, in some situations the user may be unaware of the ability of the automated assistant to interact with the foreground application as desired by the user and in response to a spoken utterance of the user. Accordingly, the user may instead utilize a greater quantity of inputs in directly interacting with the application and/or utilize a longer duration of inputs directed at the application in directly interacting with the application. For example, assume the user is unaware that speaking "add a calendar entry of patent meeting for 2:00 tomorrow" to the automated assistant would cause the automated assistant to interact with the calendar application as described above. In such a situation, to add the corresponding calendar entry at the calendar application, the user may instead have to locate and tap an "add calendar entry" interface element of the calendar application that causes an entry interface of the calendar application to be presented—then click through and populate (e.g., using a virtual keyboard and/or selection menu(s)) a date field, a time field, and a title field of the entry interface.

Further, in some situations the automated assistant may be unable to correctly ascertain whether a spoken utterance seeks to control a foreground app or, instead, seeks a general automated assistant response that is generated independent of the foreground app and without any control of the foreground app. For example, assume again a spoken utterance, of "Search for Asian fusion", that is directed to an automated assistant while a separate restaurant review application is in the foreground. In such an example, it may be unclear whether the user seeks the assistant cause a search for "Asian fusion" restaurants to be performed within the restaurant review application or, instead, wants the automated assistant to perform a general search (independent of the restaurant review application) and return a general explanation of what constitutes "Asian fusion" cuisine.

SUMMARY

Implementations set forth herein relate to an automated assistant that provides a selectable GUI element(s) when a user is interacting with an application that can be controlled via the automated assistant. The selectable GUI element can be rendered when the automated assistant determines that an application interface identifies an operation (e.g., a search function) that can be initialized or otherwise controlled via the automated assistant. The selectable GUI element can include content, such as textual content and/or graphical content, that identifies the operation and/or solicits the user to provide one or more parameters for the operation. When the selectable GUI element is rendered, a microphone and/or camera can be activated, with prior permission from the user, in order for the user to identify one or more operation parameters—without the user expressly identifying the automated assistant or the intent/operation. When one or more operation parameters have been provided by the user, the automated assistant can control the application to perform the operation (e.g., the search function) using the one or more operation parameters (e.g., search terms).

In these and other manners, interactions between an application and automated assistant can be performed with reduced and/or more concise user input. For example, the spoken utterance of the user can specify only the parameter(s) for the intent or operation, without specifying the intent or operation. This results in a more concise spoken utterance and a corresponding reduction in processing of the spoken utterance by automatic speech recognition component(s) and/or other component(s). Also, a user need not provide an express invocation phrase (e.g., "Assistant . . . "), further reducing a duration of the spoken utterance and an overall duration of the human/assistant interaction. Further, through the user selection of the GUI element, the intent of the user is clear, thereby preventing the automated assistant from misinterpreting a spoken utterance as being a general assistant request instead of a request for the assistant to control the foreground app. Yet further, through presentation of the GUI element users will become aware of the capability to control the foreground application via a spoken utterance directed to the automated assistant instead of more complex direct interaction(s) with the foreground application and/or users will more frequently control the foreground application through spoken utterances (e.g., provided after selection of the GUI element).

In some implementations, the automated assistant can determine whether an application interface includes features corresponding to respective operations that are compatible with the automated assistant and/or assistant operation. In some instances, multiple different compatible operations can be identified for an application interface, thereby causing the automated assistant to render one or more selectable GUI elements for reach respective operation. A type of selectable GUI element that is rendered by the automated assistant can depend on the corresponding operation identified by the automated assistant. For example, when a user is accessing a home control application that includes a dial GUI element for controlling a temperature of a home, the automated assistant can render a selectable GUI element that identifies a command phrase for adjusting the temperature. In some implementations, the selectable GUI element can include text such as, "Set the temperature to _____," which can indicate that the selectable GUI element corresponding to an operation for setting a temperature of the home.

The blank area or placeholder area (e.g., "_____") of the selectable GUI element can solicit the user and/or otherwise provide an indication that the user can provide a spoken utterance or other input to identify a parameter for completing the command phrase and/or initializing performance of the corresponding operation. For example, the user can tap on the selectable GUI element and/or subsequently provide a spoken utterance such as, "65 degrees," in order to complete the command phrase set forth in the text of the selectable GUI element. In response to receiving the spoken utterance, the automated assistant can control the application to cause a temperature setting of the application to be adjusted to "65" degrees. In some implementations, when the selectable GUI element is rendered by the automated assistant, the automated assistant can also cause an audio interface (e.g., one or more microphones) of the computing device to become active. Therefore, instead of the user tapping on the selectable GUI element, the user can provide a spoken utterance that identifies the parameter value (e.g., "65 degrees") without identifying the operation to be performed (e.g., "change the temperature") and without identifying the assistant (e.g., "Assistant").

In some implementations, the selectable GUI element can be rendered by the automated assistant in a foreground of the display interface of the computing device for a threshold duration of time. The duration can be selected according to one or more features associated with an interaction between the user and the application. For example, when a home screen of an application is rendered at a display interface and the user has not otherwise provided an input to the application, the selectable GUI element can be rendered for a static duration of time (e.g., 3 seconds). However, when the user is interacting (e.g., scrolling the application interface) with the application simultaneous to the selectable GUI element being rendered over the application interface, the selectable GUI element can be rendered for a duration of time that is based on how often the user provides an input to the application. Alternatively, or additionally, the duration of time that the selectable GUI element is rendered can be based on an amount of time that a corresponding application interface element is being rendered, or is expected to be rendered, at the application interface. For example, if the user typically provides an application input that transitions the application from a home screen to a login screen within a time t of viewing the home screen, the selectable GUI element can be rendered over the home screen for a duration that is based on the time t.

In some implementations, a selection of a type of selectable GUI element to be rendered can be based on a heuristic process and/or one or more trained machine learning models. For example, the automated assistant and/or operating system of a computing device can process data associated with an application interface of an application in order to identify one or more operations capable of being initialized via user interaction with the application interface. The data can include, with prior permission from a user, a screenshot of the application interface, links corresponding to graphical elements of the interface, library data and/or other functional data associated with the application and/or interface, and/or any other information that can indicate an operation capable of being initialized via the application interface.

Depending on the one or more operations identified for an application interface, the automated assistant can select and/or generate a selectable GUI element that corresponds to a respective operation. The selectable GUI element can be selected in order to provide an indication that the respective operation is capable of being controlled via the automated assistant. For example, the automated assistant can determine that a magnifying glass icon (e.g., a search icon) disposed over or adjacent to a blank text field (e.g., a search field) of an application interface can indicate that the application interface can control a search operation of the application. Based on this determination, the automated assistant can render a selectable GUI element that includes the same or a different magnifying glass icon, and/or that includes one or more natural language terms synonymous with the term "search" (e.g., "Search for _____"). In some implementations, when the selectable GUI element, the user can select the selectable GUI element by providing a spoken utterance that identifies a search parameter (e.g., "Nearby restaurants"), or by tapping the selectable GUI element and then providing the spoken utterance that identifies the search parameter.

In some implementations, a microphone of a computing device that is rendering the selectable GUI element can remain active, with prior permission from the user, after the user selects the selectable GUI element. Alternatively, or additionally, when an application interface changes in response to a selection of the selectable GUI element and/or spoken utterance, the automated assistant can select a different selectable GUI element to be rendered. The automated assistant can select another selectable GUI element to be rendered based upon the next application interface that the application transitions to. For example, when a user issues a search parameter directed to the selectable GUI element, the application can render a list of search results. A search result from the list of search results can be selectable by the user in order to cause the application to perform a particular operation. The automated assistant can determine that the particular operation is compatible with an assistant operation (e.g., an operation capable of being performed by the automated assistant) and cause another selectable GUI element (e.g., a hand with an index finger extended toward the corresponding search result) to be rendered over or adjacent to the corresponding search result. Alternatively, or additionally, the other selectable GUI element can include, for example, a text string that identifies a term corresponding to the search result (e.g., "Time Four Thai Restaurant"). When the user provides a spoken utterance that includes one or more terms that identify the corresponding search result (e.g., "Thai Restaurant"), the automated assistant can cause the corresponding search result to be selected without the user having to expressly identify the "select" operation or the automated assistant. In this way, as the automated assistant continues to identify compatible operations at each interface of the application, the user is able to navigate the interfaces by providing parameters values (e.g., "Nearby Restaurants . . . Thai Restaurant . . . Menu . . . "). In some implementations, the user can initially begin an interaction by commanding, via a first spoken utterance, the automated assistant to open a particular application (e.g., "Assistant, open my recipe application . . . "). Subsequently, when the automated assistant identifies a compatible application operation, the user can provide another command, via a second spoken utterance, for the automated assistant to control the particular application according to a parameter (e.g., the user can recite "Pad Thai" in order to cause the automated assistant to search "Pad Thai" in their recipe application). Thereafter, the user can continue navigating the particular application using these brief spoken utterances, at least while the automated assistant recognizes one or more application operations as being compatible and/or controllable via one or more respective automated assistant operations.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
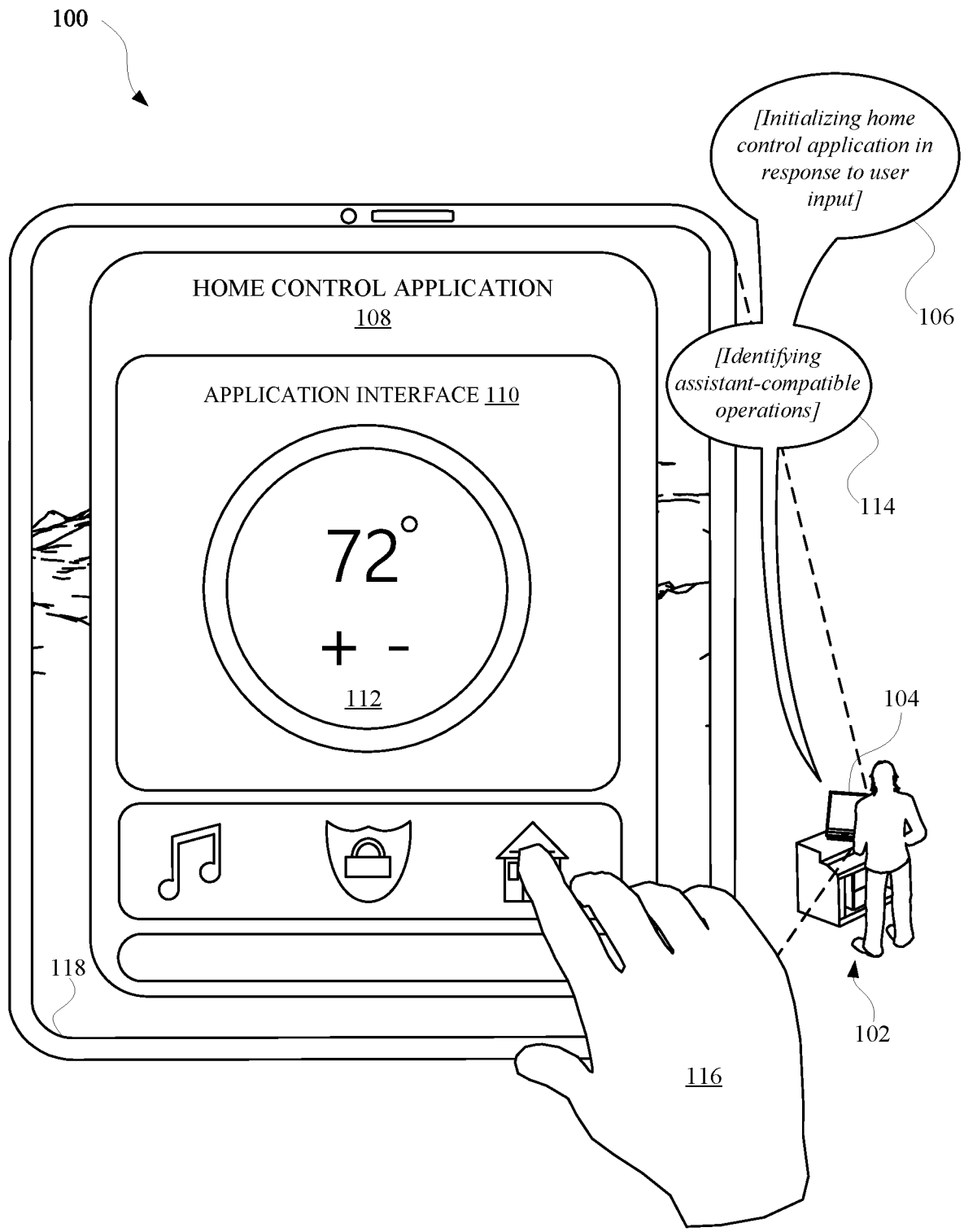
FIG. 1A, FIG. 1B, and FIG. 1C illustrate views of a user interacting with an automated assistant that recognizes and suggests assistant compatible operations at third-party application interfaces.
Figure 1B:
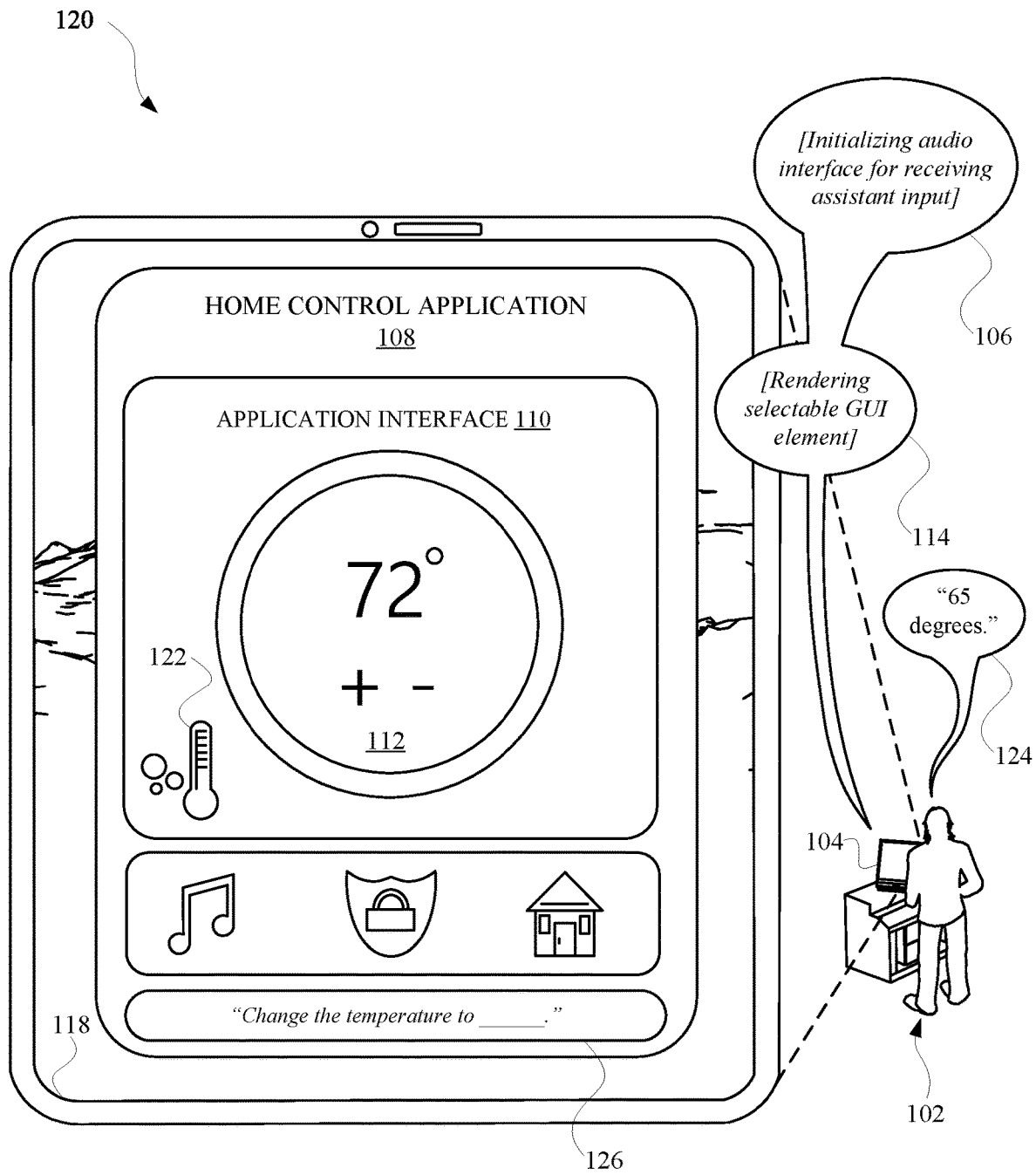
Figure 1C:
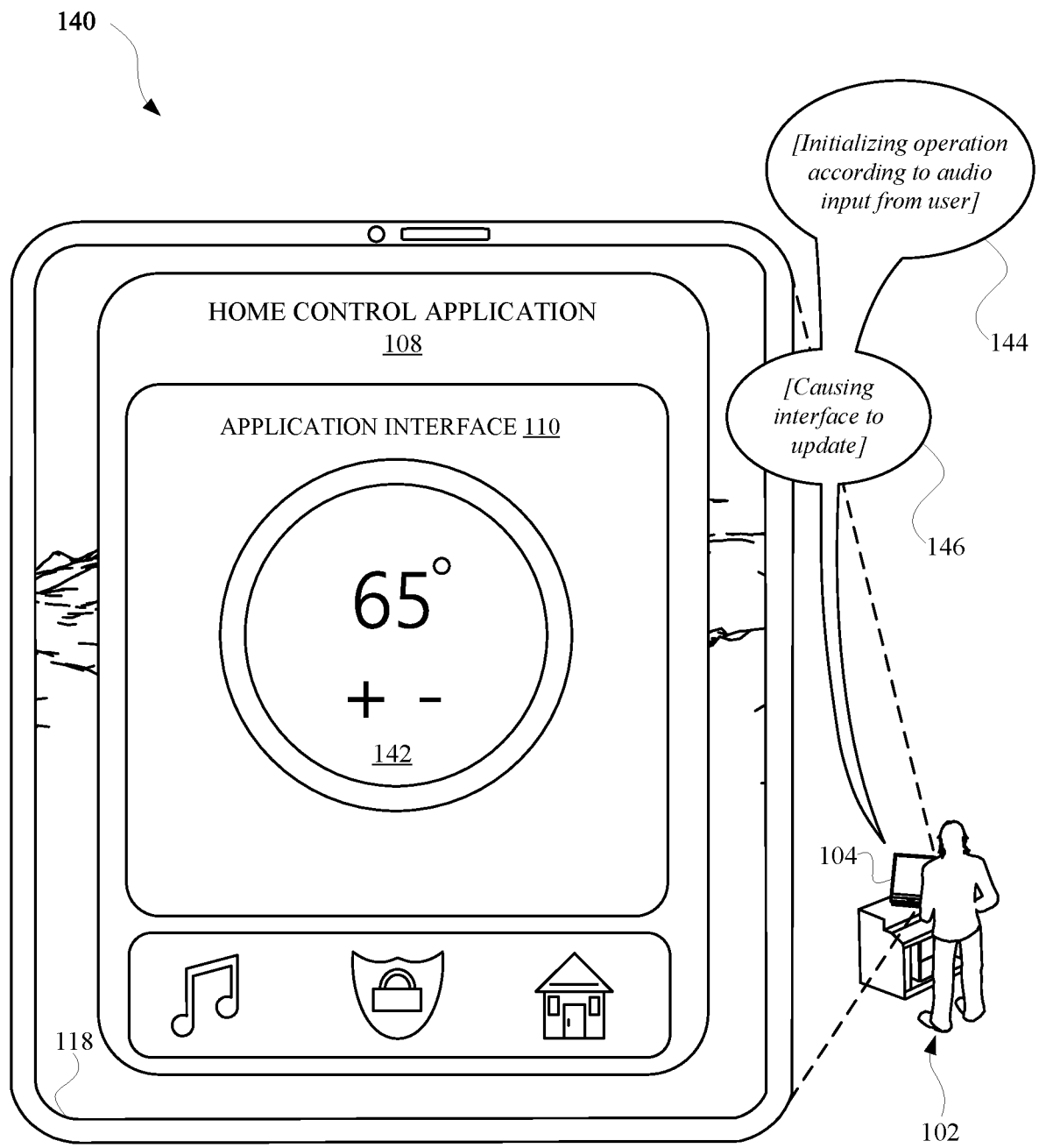

FIG. 1A, FIG. 1B, and FIG. 1C illustrate a view 100, a view 120, and a view 140, respectively, of a user 102 interacting with an automated assistant that recognizes and suggests assistant compatible operations at third-party application interfaces. When an assistant compatible operation is detected at an application interface, the automated assistant can provide an indication that one or more parameters can be provided by the user to initialize performance of the compatible operation. In this way, the user can bypass providing assistant invocation phrases and/or other inputs that might otherwise be necessary for controlling the automated assistant and/or a third-party application.

For example, a user 102 can be interacting with an assistant enabled device, such as computing device 104, in order to change settings of a home control application 108. Initially, the user 102 can initialize the home control application 108 in response to a user input 106, which can be a touch input that is provided by a hand 116 of the user 102. When the home control application 108 is launched, the user 102 can select to control certain devices within the home of the user 102, such as a heating, ventilation, and air condition (HVAC) system of the home. In order to control the HVAC system, the home control application 108 can render an application interface 110, which can include a thermostat GUI 112.

When the application interface 110 is being rendered at a display interface 118 of the computing device 104, the automated assistant can identify one or more assistant compatible operations 114. When an assistant compatible operation is identified as being associated with a selectable GUI element, the automated assistant can cause one or more graphical elements to be rendered at a display interface 118. For example, and as provided in view 120 of FIG. 1B, the automated assistant can cause a selectable GUI element 122 and/or a suggestion element 126 to be rendered at display interface 118. In some implementations, the selectable GUI element 122 can be rendered in a foreground and/or over top of the home control application 108. The selectable GUI element 122 can provide an indication to the user that the automated assistant is currently initialized and does not necessarily require an invocation phrase when the selectable GUI element 122 is being rendered. Alternatively, or additionally, the suggestion element 126 can provide natural language content characterizing a spoken utterance that can be provided to the automated assistant in order to control the home control application 108. Furthermore, the presence of the suggestion element 126 can indicate that the automated assistant is initialized and does not necessarily require an invocation phrase before acknowledging a spoken input. Alternatively, or additionally, natural language content of the suggestion element 126 can include at least a portion of a suggested spoken utterance and also a blank space, which can be a placeholder for one or more parameters for the assistant compatible operation.

For example, and as provided in FIG. 1B, the automated assistant can cause please selectable GUI element 122 to be rendered over top the home control application 108 in order to indicate that the automated assistant can receive a temperature input. In some implementations, an icon corresponding to the assistant compatible operation can be selected for rendering with the selectable GUI element 122. Selection of the icon can be based on a parameter that can be provided by the user 102 in order to control the thermostat GUI 112. For example, a thermometer icon can be selected to indicate that the user can specify a value for temperature in order to control the application interface 110 and adjust the thermostat GUI 112. The user 102 can then provide a spoken utterance 124 such as, "65 degrees," thereby indicating to the automated assistant that the user would like the automated assistant to modify the temperature setting of the home control application 108 from 72 degrees to 65 degrees.

In response to the spoken utterance 124, the automated assistant can initialize the assistant compatible operation 144. For example, the automated assistant can generate a request to the home control application 108 to modify the current setting of the thermostat from 72 degrees to 65 degrees. In some implementations, an application programming interface (API) can be used to interface between the automated assistant and the home control application 108. The home control application 108 can process the request from the automated assistant and modify the thermostat setting accordingly. Additionally, an updated thermostat GUI 142 can be rendered at the application interface 110 as an update 146 in order to indicate to the user 102 that the automated assistant and the home control application 108 successfully performed the operation. In some implementations, the selectable GUI element 122 and/or the suggestion element 126 can be removed from the display interface 118 after a threshold duration of time has transpired, and/or whether or not the user 102 interacted with the selectable GUI element 122 or the suggestion element 126. For example, the selectable GUI element 122 can be rendered for a threshold duration of time from when the home control application 108 is initially rendered at the display interface 118. If the user 102 did not interact with the selectable GUI element 122 for the threshold duration of time, the automated assistant can cause the selectable a GUI element 122 to no longer be rendered at the display interface 118 and/or provide a notification that these delectable GUI element 122 will be removed after a period of time.

Figure 2A:
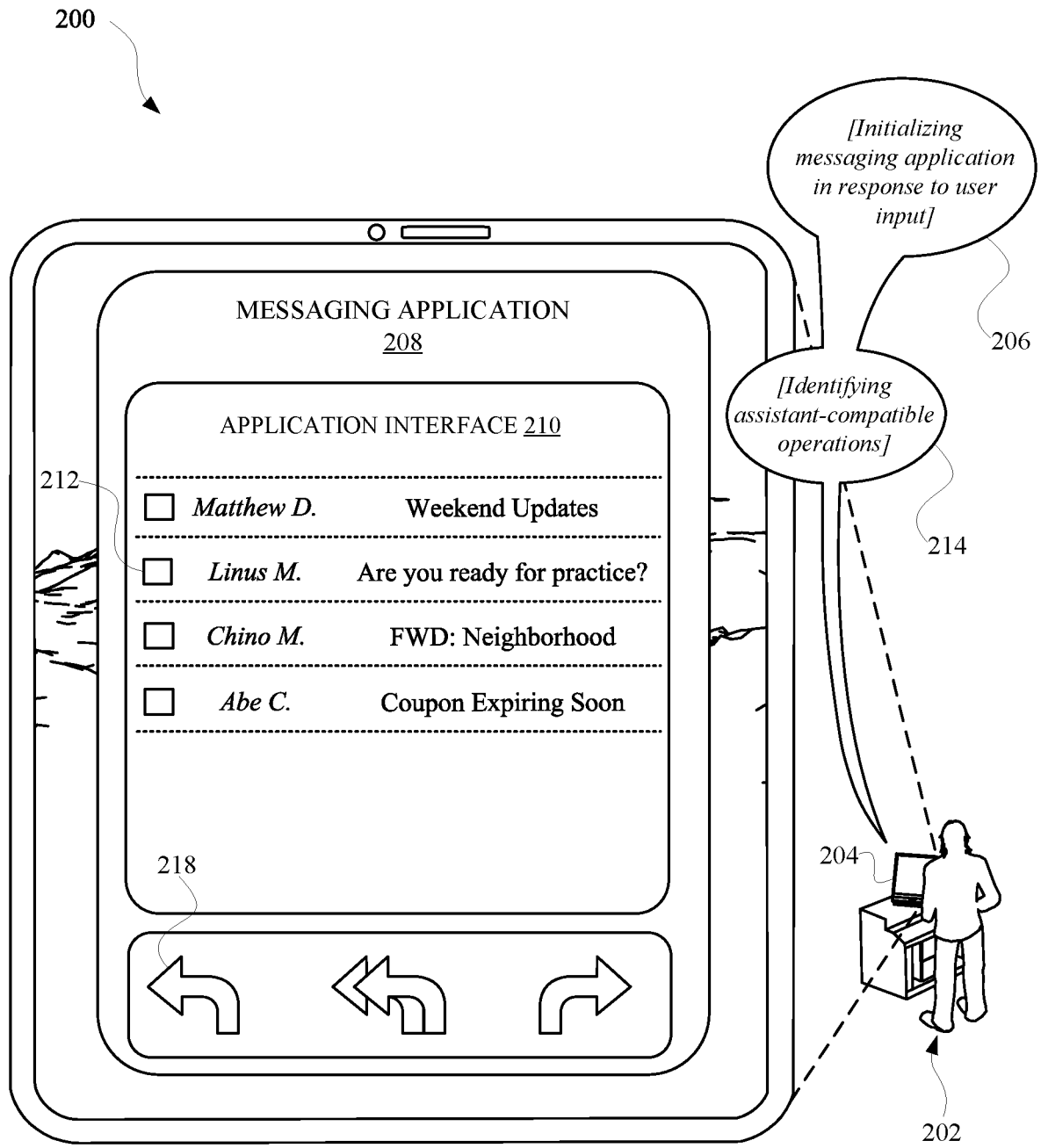
FIG. 2A, FIG. 2B, and FIG. 2C illustrate views of a user interacting with an application that provides one or more operations that are capable of being controlled by an automated assistant.
Figure 2B:
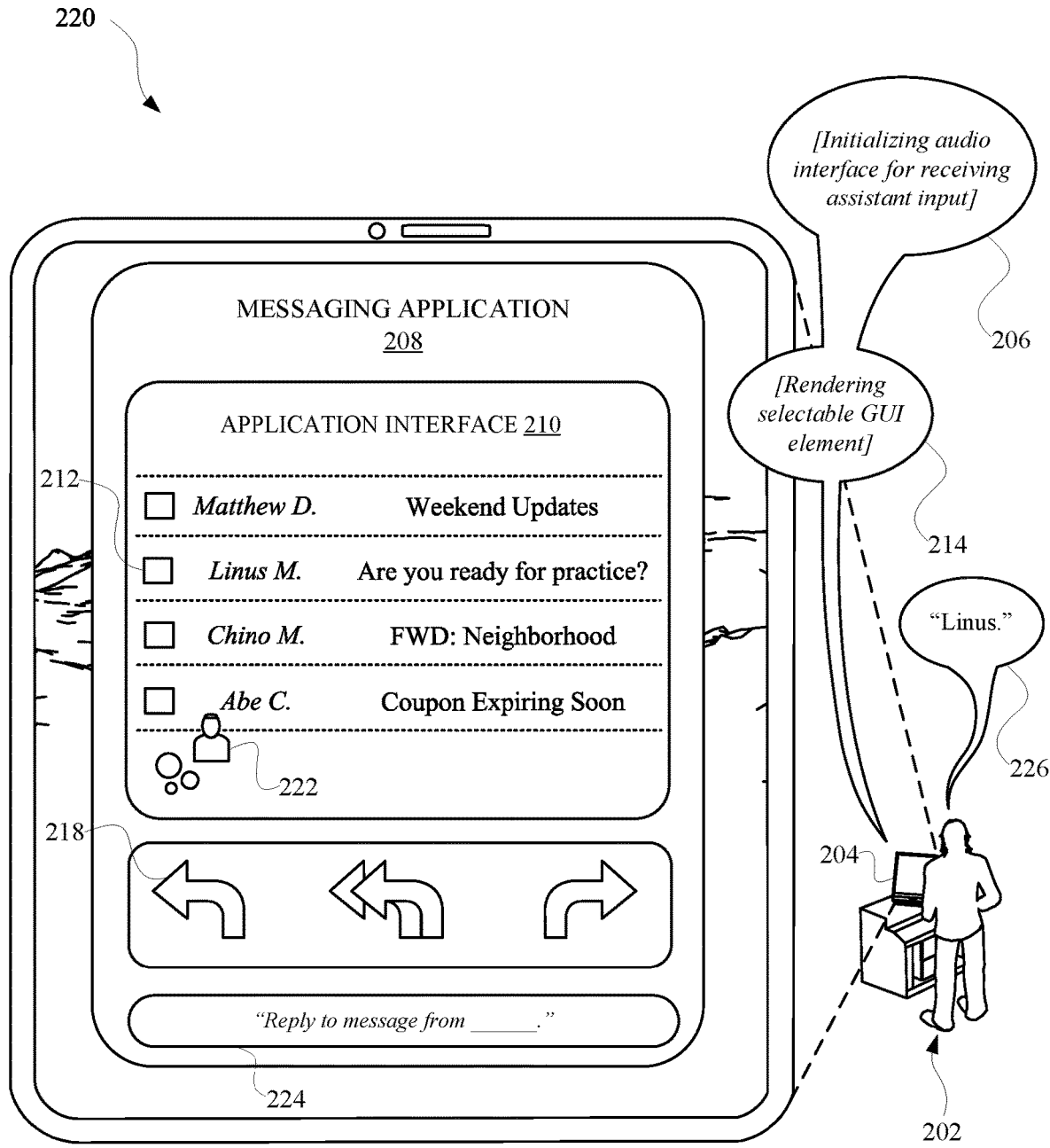
Figure 2C:
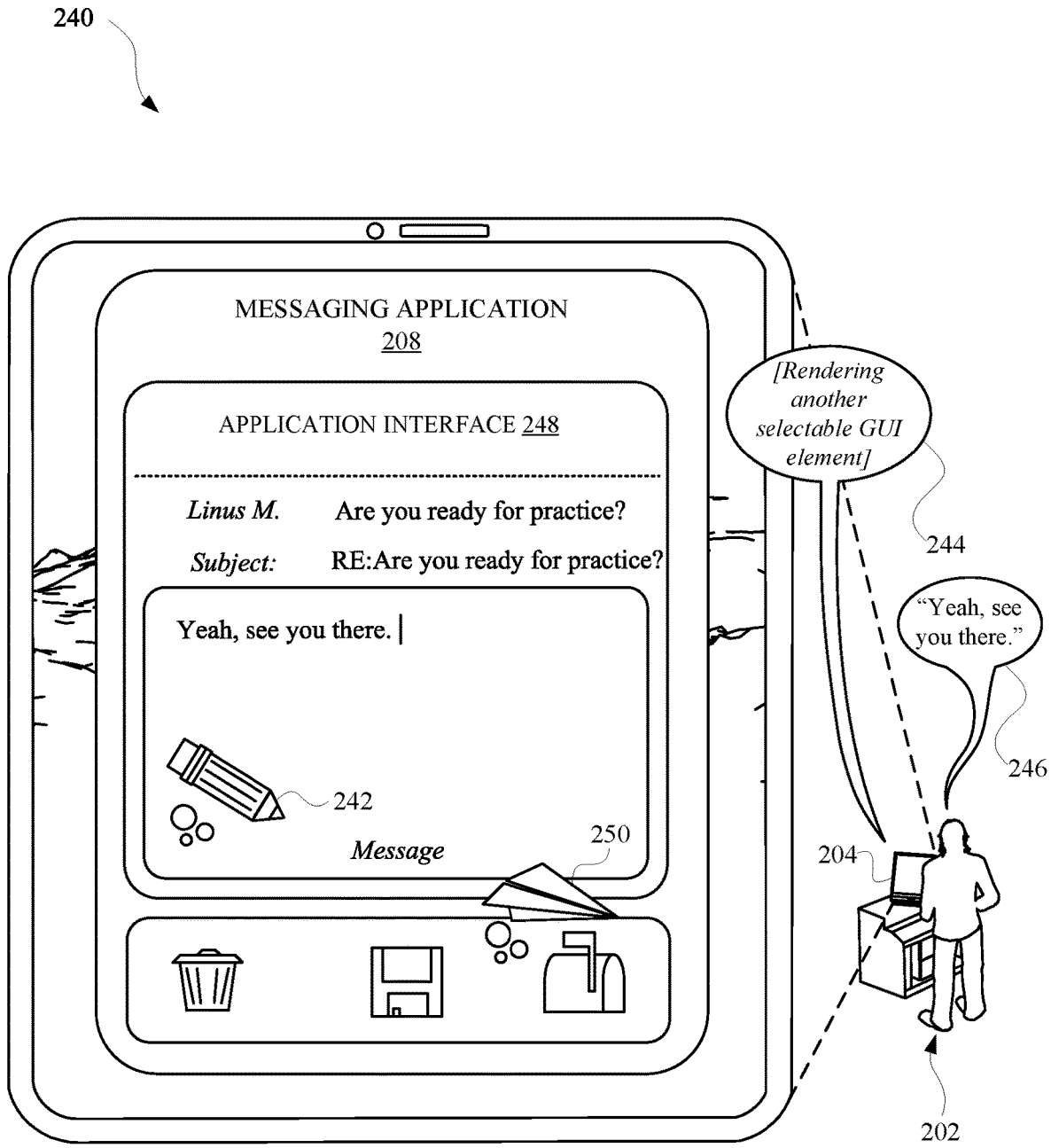

FIG. 2A, FIG. 2B, and FIG. 2C illustrate a view 200, a view 220, and a view 240, respectively, of a user 202 interacting with an application that provides one or more operations that are capable of being controlled by an automated assistant. For example, the user 202 can access a messaging application 208 using a computing device 204. In response to the user 202 launching the messaging application 208, an automated assistant that is accessible via the computing device 204 can determine whether features of the messaging application 208 can be controlled through the automated assistant. In some implementations, the automated assistant can determine that one or more operations can be performed using a particular parameter identified by the user 202. For example, the automated assistant can determine that in order to reply to a message, a check box 212 must be selected for a particular message, followed by selecting a reply icon 218. In some implementations, the automated assistant can make this determination based on a heuristic process and/or one or more trained machine learning models. For example, training data for one or more trained machine learning models can characterize instances in which the reply icon 218 is selected without a check box 212 being selected, and other instances in which the reply icon 218 is selected when a check box 212 is selected. In some implementations, the one or more trained machine learning models can be used to process screenshots and/or other images of application interfaces, with prior permission from the users, in order to cause certain selectable GUI elements and/or selectable suggestions to be rendered at the computing device 204.

When the computing device 204 has initialized the messaging application 208 in response to a user input 206, the automated assistant can identify assistant-compatible operations that are available via an application interface 210 of the messaging application 208. When one or more assistant compatible operations are identified, the automated assistant can cause one or more selectable GUI elements 222 and/or one or more selectable suggestions 224 to be rendered 214 at the computing device 204. The selectable GUI element 222 can be rendered to indicate that the automated assistant and/or an audio interface has been initialized and that the user 202 can identify a parameter in order to cause the automated assistant to control the messaging application 208 using the parameter.

For example, the selectable GUI element 222 can include a graphical representation of a person or contact, thereby indicating that the user 202 should identify a name of a person that the user 202 would like to send a message to. Alternatively, or additionally, the selectable suggestion 224 can include a textual identifier and/or graphical content that identifies a command that can be issued to the automated assistant but that is also missing one or more parameters. For example, the selectable suggestion 224 can include the phrase, "Reply to message from," which can indicate that the automated assistant can reply to a message identified in the application interface 210 if the user 202 identifies a contact associated with a particular message. The user 202 can then provide a spoken utterance 226 that identifies a parameter for the assistant compatible operation. In response to the spoken utterance 226, the automated assistant can make a selection of a check box 212 corresponding to the parameter (e.g., "Linus") identified by the user 202. Additionally, in response to the spoken utterance 226, the automated assistant can select the reply icon 218, in order to cause the messaging application 208 to reply to a message from a contact identified by the user 202. Alternatively, or additionally, as a back end process, the automated assistant can communicate an API call to the messaging application 208 in order to initialize replying to a message from the contact identified by the user 202.

In response to the spoken utterance 226 from the user 202, the automated assistant can cause the messaging application 208 to process a request to reply to a message from a contact (e.g., Linus) identified by the user 202. When the messaging application 208 receives the request from the automated assistant, the messaging application 208 can render an updated application interface 248. The application interface 248 can correspond to a draft reply message that can be modified by the user 202. The automated assistant can process content of the application interface 248 and/or other data stored in association with the application interface 248 in order to determine whether to provide the user 202 with additional suggestions. For example, the automated assistant can cause one or more additional selectable GUI elements 242 to be rendered in a foreground of the application interface 248. The selectable GUI element 242 can be rendered at operation 244 in order to indicate to the user 202 that the automated assistant is active and that the user 202 is able to provide a spoken utterance that details the composition of the reply message. For example, when the selectable GUI element 242 is being rendered, the user 202 can provide another spoken utterance 246 such as, "Yeah, see you there," for the composition of the message, without expressly identifying the operation and/or identifying the automated assistant.

In response, the automated assistant can communicate another request to the messaging application 208 in order to cause the messaging application 208 to perform one or more operations for inputting the text "Yeah, see you there" into the body of the message. Thereafter, the user 202 can provide another spoken utterance (e.g., "Send") that is directed to the automated assistant and a separate selectable GUI element 250. In this way, the user 202 can cause the messaging application 208 to send the message without expressly identifying the automated assistant and without providing a touch input to the computing device 204 and the messaging application 208. This can reduce a number of inputs that need to be provided directly from the user 202 to third party applications. Furthermore, the user 202 will be able to rely on the automated assistant when interacting with most other applications that may not employ trained machine learning models that have been trained based on actual interactions with the user 202.

Figure 3:
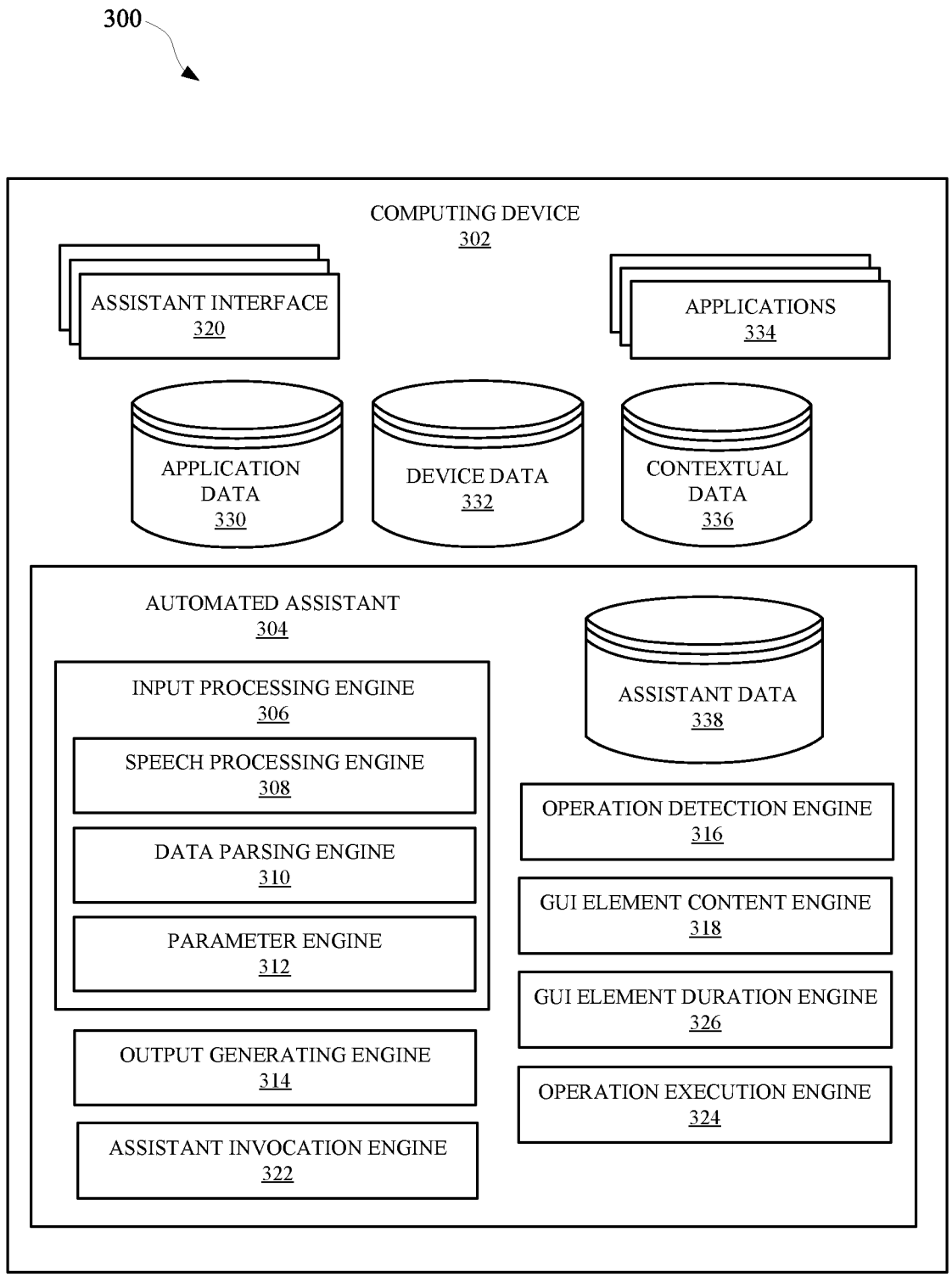
FIG. 3 illustrates a system with an automated assistant that can provide, when a user is accessing a third party application that is controllable via the automated assistant, a selectable action intent suggestion that includes an indication that one or more parameters should be provided by the user to control an operation.

FIG. 3 illustrates a system 300 with an automated assistant 304 that can provide, when a user is accessing a third party application that is controllable via the automated assistant, a selectable action intent suggestion that includes an indication that one or more parameters should be provided by the user in order to initialize an action. One or more operations associated with the action intent can be initialized in response to the user providing an input (e.g., a spoken utterance) that identifies one or more parameters, without the user necessarily identifying the automated assistant 304 or the third party application. The automated assistant 304 can operate as part of an assistant application that is provided at one or more computing devices, such as a computing device 302 and/or a server device. A user can interact with the automated assistant 304 via assistant interface(s) 320, which can be a microphone, a camera, a touch screen display, a user interface, and/or any other apparatus capable of providing an interface between a user and an application. For instance, a user can initialize the automated assistant 304 by providing a verbal, textual, and/or a graphical input to an assistant interface 320 to cause the automated assistant 304 to initialize one or more actions (e.g., provide data, control a peripheral device, access an agent, generate an input and/or an output, etc.). Alternatively, the automated assistant 304 can be initialized based on processing of contextual data 336 using one or more trained machine learning models. The contextual data 336 can characterize one or more features of an environment in which the automated assistant 304 is accessible, and/or one or more features of a user that is predicted to be intending to interact with the automated assistant 304. The computing device 302 can include a display device, which can be a display panel that includes a touch interface for receiving touch inputs and/or gestures for allowing a user to control applications 334 of the computing device 302 via the touch interface. In some implementations, the computing device 302 can lack a display device, thereby providing an audible user interface output, without providing a graphical user interface output. Furthermore, the computing device 302 can provide a user interface, such as a microphone, for receiving spoken natural language inputs from a user. In some implementations, the computing device 302 can include a touch interface and can be void of a camera, but can optionally include one or more other sensors.

The computing device 302 and/or other third party client devices can be in communication with a server device over a network, such as the internet. Additionally, the computing device 302 and any other computing devices can be in communication with each other over a local area network (LAN), such as a Wi-Fi network. The computing device 302 can offload computational tasks to the server device in order to conserve computational resources at the computing device 302. For instance, the server device can host the automated assistant 304, and/or computing device 302 can transmit inputs received at one or more assistant interfaces 320 to the server device. However, in some implementations, the automated assistant 304 can be hosted at the computing device 302, and various processes that can be associated with automated assistant operations can be performed at the computing device 302.

In various implementations, all or less than all aspects of the automated assistant 304 can be implemented on the computing device 302. In some of those implementations, aspects of the automated assistant 304 are implemented via the computing device 302 and can interface with a server device, which can implement other aspects of the automated assistant 304. The server device can optionally serve a plurality of users and their associated assistant applications via multiple threads. In implementations where all or less than all aspects of the automated assistant 304 are implemented via computing device 302, the automated assistant 304 can be an application that is separate from an operating system of the computing device 302 (e.g., installed "on top" of the operating system)—or can alternatively be implemented directly by the operating system of the computing device 302 (e.g., considered an application of, but integral with, the operating system).

In some implementations, the automated assistant 304 can include an input processing engine 306, which can employ multiple different modules for processing inputs and/or outputs for the computing device 302 and/or a server device. For instance, the input processing engine 306 can include a speech processing engine 308, which can process audio data received at an assistant interface 320 to perform speech recognition and/or identify the text embodied in the audio data. The audio data can be transmitted from, for example, the computing device 302 to the server device in order to preserve computational resources at the computing device 302. Additionally, or alternatively, the audio data can be exclusively processed at the computing device 302.

The process for converting the audio data to text can include a speech recognition algorithm, which can employ neural networks, and/or statistical models for identifying groups of audio data corresponding to words or phrases. The text converted from the audio data can be parsed by a data parsing engine 310 and made available to the automated assistant 304 as textual data that can be used to generate and/or identify command phrase(s), intent(s), action(s), slot value(s), and/or any other content specified by the user. In some implementations, output data provided by the data parsing engine 310 can be provided to a parameter engine 312 to determine whether the user provided an input that corresponds to a particular intent, action, and/or routine capable of being performed by the automated assistant 304 and/or an application or agent that is capable of being accessed via the automated assistant 304. For example, assistant data 338 can be stored at the server device and/or the computing device 302, and can include data that defines one or more actions capable of being performed by the automated assistant 304, as well as parameters necessary to perform the actions. The parameter engine 312 can generate one or more parameters for an intent, action, and/or slot value, and provide the one or more parameters to an output generating engine 314. The output generating engine 314 can use the one or more parameters to communicate with an assistant interface 320 for providing an output to a user, and/or communicate with one or more applications 334 for providing an output to one or more applications 334.

In some implementations, the automated assistant 304 can be an application that can be installed "on-top of" an operating system of the computing device 302 and/or can itself form part of (or the entirety of) the operating system of the computing device 302. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 302. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data.

NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 302 can include one or more applications 334 which can be provided by a third-party entity that is different from an entity that provided the computing device 302 and/or the automated assistant 304. An application state engine of the automated assistant 304 and/or the computing device 302 can access application data 330 to determine one or more actions capable of being performed by one or more applications 334, as well as a state of each application of the one or more applications 334 and/or a state of a respective device that is associated with the computing device 302. A device state engine of the automated assistant 304 and/or the computing device 302 can access device data 332 to determine one or more actions capable of being performed by the computing device 302 and/or one or more devices that are associated with the computing device 302. Furthermore, the application data 330 and/or any other data (e.g., device data 332) can be accessed by the automated assistant 304 to generate contextual data 336, which can characterize a context in which a particular application 334 and/or device is executing, and/or a context in which a particular user is accessing the computing device 302, accessing an application 334, and/or any other device or module.

While one or more applications 334 are executing at the computing device 302, the device data 332 can characterize a current operating state of each application 334 executing at the computing device 302. Furthermore, the application data 330 can characterize one or more features of an executing application 334, such as content of one or more graphical user interfaces being rendered at the direction of one or more applications 334. Alternatively, or additionally, the application data 330 can characterize an action schema, which can be updated by a respective application and/or by the automated assistant 304, based on a current operating status of the respective application. Alternatively, or additionally, one or more action schemas for one or more applications 334 can remain static, but can be accessed by the application state engine in order to determine a suitable action to initialize via the automated assistant 304.

The computing device 302 can further include an assistant invocation engine 322 that can use one or more trained machine learning models to process application data 330, device data 332, contextual data 336, and/or any other data that is accessible to the computing device 302. The assistant invocation engine 322 can process this data in order to determine whether or not to wait for a user to explicitly speak an invocation phrase to invoke the automated assistant 304, or consider the data to be indicative of an intent by the user to invoke the automated assistant—in lieu of requiring the user to explicitly speak the invocation phrase. For example, the one or more trained machine learning models can be trained using instances of training data that are based on scenarios in which the user is in an environment where multiple devices and/or applications are exhibiting various operating states. The instances of training data can be generated in order to capture training data that characterizes contexts in which the user invokes the automated assistant and other contexts in which the user does not invoke the automated assistant.

When the one or more trained machine learning models are trained according to these instances of training data, the assistant invocation engine 322 can cause the automated assistant 304 to detect, or limit detecting, spoken invocation phrases from a user based on features of a context and/or an environment. Additionally, or alternatively, the assistant invocation engine 322 can cause the automated assistant 304 to detect, or limit detecting for one or more assistant commands from a user based on features of a context and/or an environment. In some implementations, the assistant invocation engine 322 can be disabled or limited based on the computing device 302 detecting an assistant suppressing output from another computing device. In this way, when the computing device 302 is detecting an assistant suppressing output, the automated assistant 304 will not be invoked based on contextual data 336—which would otherwise cause the automated assistant 304 to be invoked if the assistant suppressing output was not being detected.

In some implementations, the system 300 can include an operation detection engine 316 that can identify one or more operations that are capable of being executed by the applications 334 and controlled via the automated assistant 304. For example, the operation detection engine 316 can process application data 330 and/or device data 332 in order to determine whether an application is executing at the computing device 302. The automated assistant 304 can determine whether the application can be controlled via the automated assistant 304, and can identify one or more application operations that are capable of being controlled via the automated assistant 304. For example, application data 330 that identifies one or more application GUI elements being rendered at an interface of the computing device 302, and the application data 330 can be processed to identify one or more operations capable of being controlled via the application GUI elements. When an operation is identified as being compatible with the automated assistant 304, the operation detection engine 316 can communicate with a GUI element content engine 318 in order to generate a selectable GUI element corresponding to the operation.

The GUI element content engine 318 can identify one or more operations that the automated assistant 304 has determined are compatible with the automated assistant 304 and generate one or more respective selectable GUI elements based on the one or more operations. For example, when a search icon and/or a search text field is determined to be available by an application, and an application search operation is compatible with the automated assistant 304, the GUI element content engine 318 can generate content for rendering at a display interface of the computing device 302. The content can include textual content (e.g., natural language content) and/or graphical content that can be based on the compatible operation (e.g., the application search operation). In some implementations, a command phrase for directing the automated assistant 304 to initialize the operation can be generated and rendered in order to put the user on notice of the compatible operation that has been identified. Alternatively, or additionally, the command phrase can be a partial command phrase that omits one or more parameters for the operation, thereby indicating to the user that the user can provide the one or more parameters to the automated assistant 304 for initializing the operation. The textual content and/or graphical content can be rendered at a display interface of the computing device 302 simultaneous to the application rendering one or more additional GUI elements. The user can initialize performance of the compatible operation by tapping the display interface to select the selectable GUI element and/or provide a spoken utterance that specifies the one or more parameters to the automated assistant 304.

In some implementations, the system 300 can include a GUI element duration engine 326, which can control a duration that the selectable GUI element is rendered at the display interface by the automated assistant 304. In some implementations, the amount of time that a selectable GUI element is rendered can be based on an amount of interaction between the user and the automated assistant 304, and/or an amount of interaction between the user and the application associated with the selectable GUI element. For example, the GUI element duration engine 326 can establish a longer duration of display time for a selectable GUI element when the user has not yet provided an input to the application since the selectable GUI element was rendered. This longer duration can be longer relative to a duration of display time for a selectable GUI element that is being rendered when the user has provided an input to the application (not the automated assistant 304). Alternatively, or additionally, the duration of display time for a selectable GUI element can be longer for selectable GUI elements that the user has previously interacted with in the past. This longer duration can be relative to a duration for other selectable GUI elements that have been previously presented to the user but that the user has not previously interacted with or otherwise expressed interest in.

In some implementations, the system 300 can include an operation execution engine 324 that can initialize one or more operations of an identified application in response to a user identifying one or more parameters for the operations. For example, when the selectable GUI element is being rendered over top of an application interface by the automated assistant 304, the user can select the selectable GUI element and/or provide a spoken utterance that identifies a parameter. The operation execution engine 324 can then process the selection and/or spoken utterance and generate one or more requests to the application based on one or more parameters identified by the user. For example, a spoken utterance processed by the input processing engine 306 can result in identification of one or more particular parameter values. The parameter values can be used by the operation execution engine 324 to generate one or more requests to the application corresponding to the selectable GUI element that the user identified. For example, a request generated by the automated assistant 304 can identify the operation to be performed, one or more parameters identified by the automated assistant 304, and/or one or more parameters identified by the user. In some implementations, the automated assistant 304 can select one or more parameters for an operation and the user can identify one or more additional parameters in order for the operation to be initialized. For instance, when the application is a travel booking application, the automated assistant 304 can assume a date parameter (e.g., month of "January") and the user can specify a destination city via a spoken utterance (e.g., "Nairobi"). Based on this data, and a corresponding selectable GUI element being rendered at the display interface, the operation execution engine 324 can generate a request to the travel booking application to initialize performance of the operation (e.g., Application.Travel.com[search.setCity("Nairobi"), search.setTime("January")]). This request can be received by the travel booking application from the automated assistant 304 and, in response, the travel booking application can render a different application interface that includes the results of the operation (e.g., a list of results for available hotels in Nairobi in January).

Figure 4:
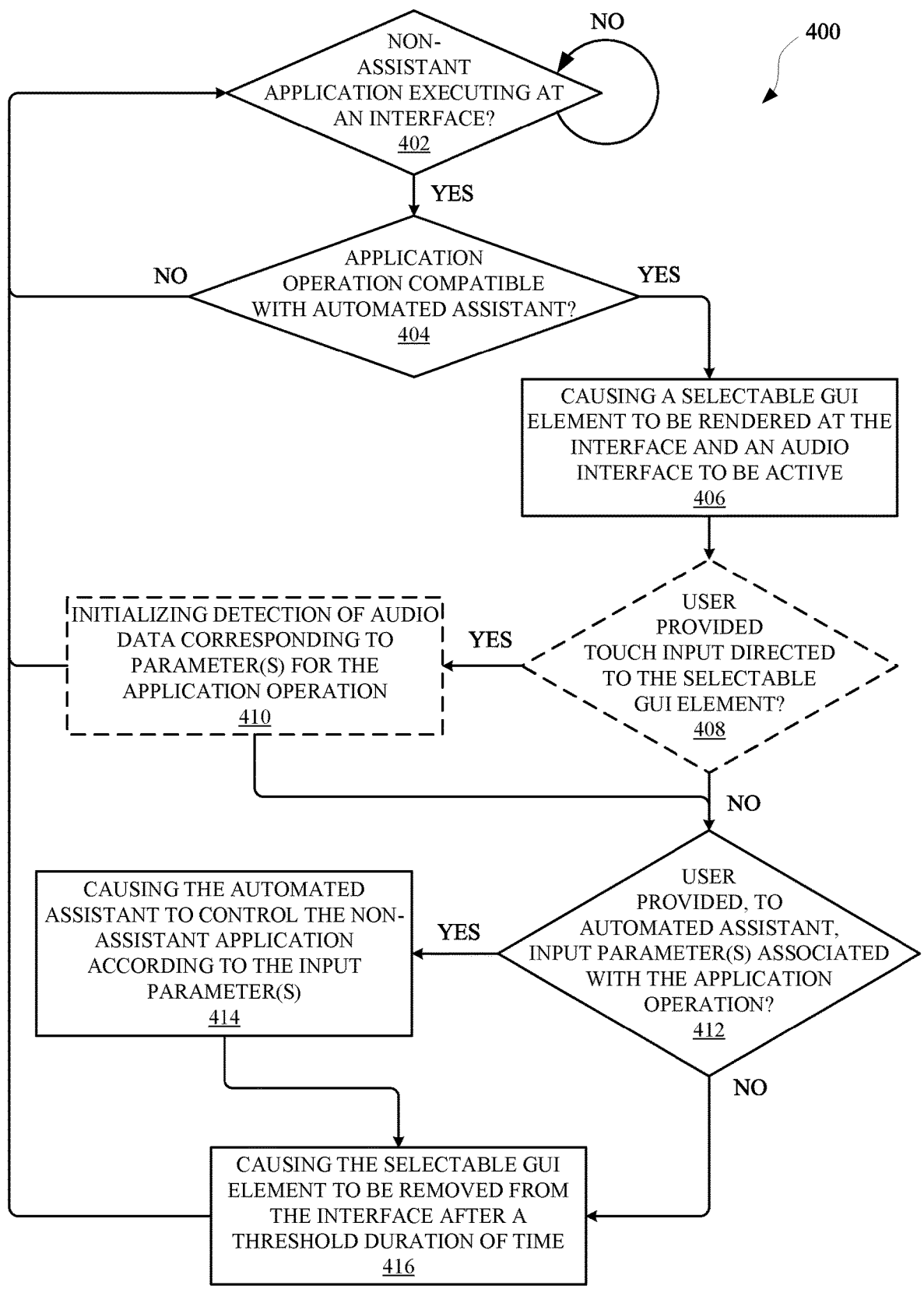
FIG. 4 illustrates a method for providing a selectable GUI element at an interface of a computing device when an application operation, that is compatible with an automated assistant, is executable via the interface.

FIG. 4 illustrates a method 400 for providing a selectable GUI element at an interface of a computing device when an application operation, that is compatible with an automated assistant, is executable via the interface. The method 400 can be performed by one or more applications, devices, and/or any other apparatus or module capable of interacting with an automated assistant. In some implementations, the method 400 can include an operation 402 of determining whether a non-assistant application is executing at an interface of a computing device. The computing device can provide access to an automated assistant, which can be responsive to natural language input from a user in order to control multiple different applications and/or devices. The automated assistant can process data that indicates whether certain applications are executing at the computing device. For example, data that is based on content being rendered at the interface can be processed by the automated assistant in order to identify application operations that are capable of being initialized via the interface. When a non-assistant application is determined to be executing at the interface, such as a display interface of a computing device, the method 400 can proceed from the operation 402 to an operation 404. Otherwise, the automated assistant can continue to determine whether an application is executing at the interface of the computing device.

The operation 404 can include determining whether an application operation is compatible with the automated assistant. In other words, the automated assistant can determine whether an operation, capable of being performed by the application, can be controlled or otherwise initialized by the automated assistant. For example, when the application is a home control application and the application interface includes a control dial GUI, the automated assistant can determine that an operation controlled by the control dial GUI is compatible with one or more functions of the automated assistant. Therefore, the automated assistant can operate to control the control dial GUI and/or a corresponding application operation. When an application operation is determined to be compatible with the automated assistant, the method 400 can proceed from the operation 404 to an operation 406. Otherwise, the automated assistant can continue to determine whether any other application operations are compatible with the automated assistant, or whether any other non-assistant applications are executing at the computing device or a separate computing device.

The operation 406 can include causing a selectable GUI element to be rendered at the interface, and also causing an audio interface to be active at the computing device. The selectable GUI element can provide an indication that the automated assistant is active for receiving one or more input parameters. In some implementations, the selectable GUI element can include textual content and/or graphical content that is based on the application operation identified at the operation 404. In this way, the user can be on notice that the automated assistant can receive an input identifying one or more parameters for a particular application operation, at least while the selectable GUI is being rendered at the interface. In some implementations, graphical content and/or textual content of the selectable GUI element can indicate that a microphone is active for receiving a user input from the user. For example, the selectable GUI element can have dynamic properties that indicate one or more sensors associated with the computing device are active. Alternatively, or additionally, textual content of the selectable GUI element can identify one or more partial assistant command phrases that lack one or more respective parameters, which should be identified for one or more respective application operations to be performed.

When the selectable GUI element is rendered at the interface, the method 400 can proceed from the operation 406 to an optional operation 408 that includes determining whether the user provided a touch input or another input that is directed to the selectable GUI element. When the user is determined to have provided an input that is directed to the selectable GUI element, the method 400 can proceed from the operation 408 to an optional operation 410. The operation 410 can include initializing detection of audio data corresponding to parameters for the application operation. For example, the automated assistant can identify one or more speech processing models for identifying one or more parameters associated with the application operation. In some instances, a speech processing model for identifying numbers of various sizes can be employed when the application operation includes one or more numbers as potential parameters. Alternatively, or additionally, a speech processing model for identifying proper names in speech can be employed when the application operation includes one or more proper names as possible parameters.

The method 400 can proceed from the operation 410 or the operation 408 to an operation 412, which can include determining whether the user provided, to the automated assistant, input parameters associated with the application operation. For example, the user can provide an input associated with the application operation by identifying a value for a control dial GUI. Alternatively, or additionally, the user can provide an input associated with the application operation by identifying one or more other values that can be used as one or more parameters for an application operation. For example, when the application operation is controllable via a control dial GUI of the application, the user can provide a spoken utterance to the automated assistant such as, "10 percent." This spoken utterance can indicate that the user is specifying "10 percent" as the parameter of the application operation, and that the automated assistant should initialize the application operation based on this identified parameter. When the application operation, for example, corresponds to brightness of lights in a home of the user, the user specifying the value for the parameter can cause the automated assistant to adjust the brightness of the lights via the application (e.g., an IoT application that controls Wi-Fi enabled light bulbs).

When the user is determined to have provided an input that identifies one or more parameters for the application operation, the method 400 can proceed from the operation 412 to an operation 414. The operation 414 can include causing the automated assistant to control the non-assistant application according to the input parameter(s) identified by the user. For example, when the user provides a spoken utterance such as, "10 percent," the automated assistant can control the non-assistant application in order to cause one or more lights associated with the non-assistant application to be adjusted to a 10% brightness level. This can be performed without the user expressly identifying the assistant or the non-assistant application in the spoken utterance. This can preserve computational resources and limit possibilities for certain interference (e.g., background noise) from affecting audio data captured by the automated assistant. When the user does not provide, within a threshold duration of time, an input that identifies a parameter, the method 400 can proceed from the operation 412 to an operation 416, which can include causing the selectable GUI element to be removed from the interface after the threshold duration of time. The method 400 can proceed from the operation 414 to the operation 416, and, thereafter, the method 400 can return to the operation 402 or another operation.

Figure 5:
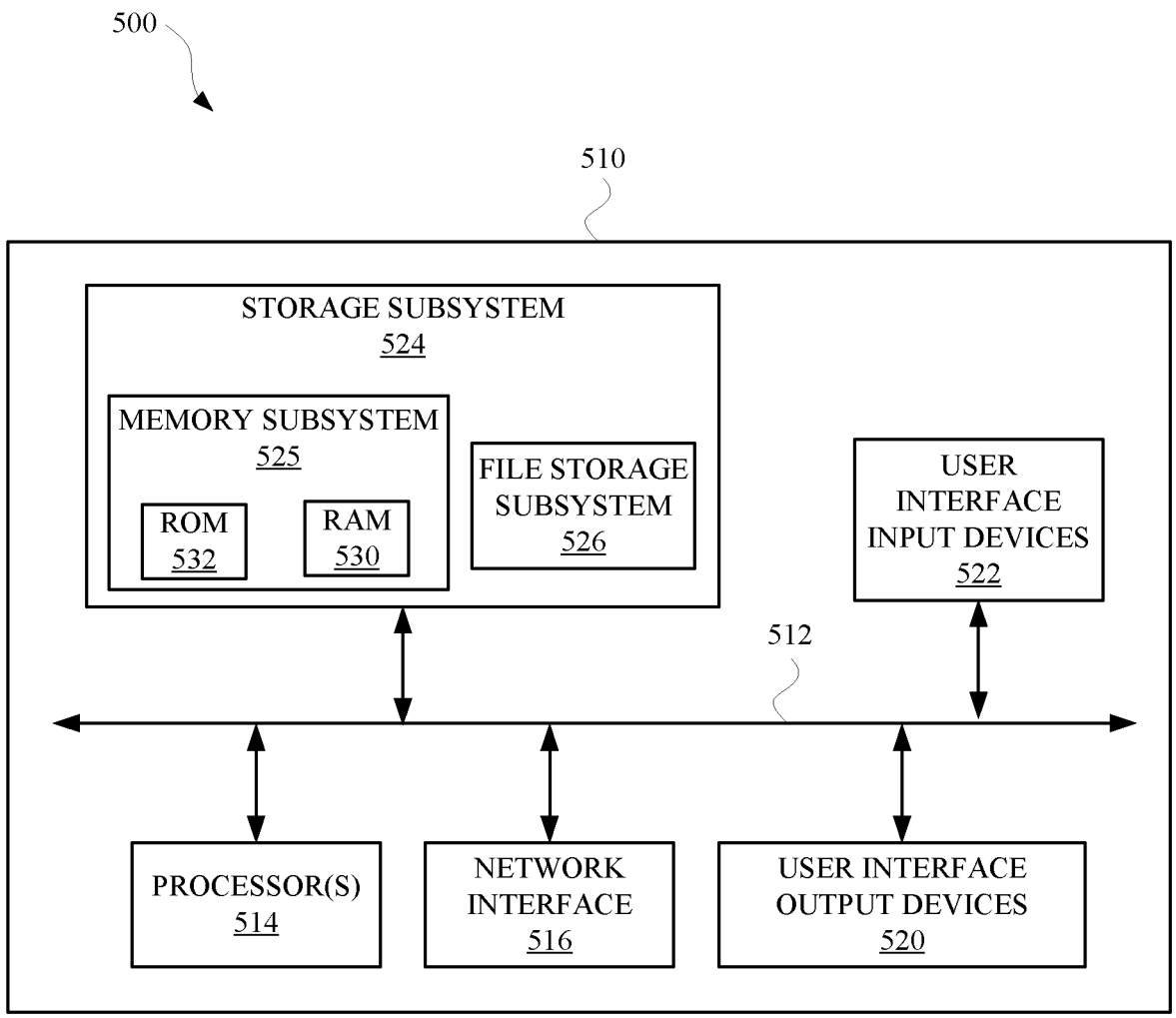
FIG. 5 is a block diagram of an example computer system.

FIG. 5 is a block diagram 500 of an example computer system 510. Computer system 510 typically includes at least one processor 514 which communicates with a number of peripheral devices via bus subsystem 512. These peripheral devices may include a storage subsystem 524, including, for example, a memory 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of method 400, and/or to implement one or more of system 300, computing device 104, computing device 204, an automated assistant, and/or any other application, device, apparatus, and/or module discussed herein.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as determining that an assistant operation is compatible with an application that is executing at a computing device, wherein the application is separate from an automated assistant that is accessible via the computing device. The method can further include an operation of causing, based on the assistant operation being compatible with the application, a selectable graphical user interface (GUI) element to be rendered at a display interface of the computing device, wherein the selectable GUI element identifies the assistant operation and is rendered in a foreground of the display interface of the computing device. The method can further include an operation of detecting, by the automated assistant, a selection of the selectable GUI element by a user via the display interface of the computing device. The method can further include an operation of performing speech recognition on audio data that captures a spoken utterance that is provided by the user and is received at an audio interface of the computing device after the selection of the selectable GUI element, wherein the spoken utterance specifies a particular value for a parameter of the assistant operation without expressly identifying the assistant operation. The method can further include an operation of causing, in response to the spoken utterance from the user, the automated assistant to control the application based on the assistant operation and the particular value for the parameter.

In some implementations, causing the selectable GUI element to be rendered at the display interface of the computing device includes: generating content that is rendered with the selectable GUI element, wherein the content includes: a textual identifier or a graphical representation of the assistant operation, and a placeholder area indicating that the user can specify a value for the parameter. In some implementations, causing the selectable GUI element to be rendered at the display interface of the computing device includes: causing the selectable GUI element to be rendered over an application interface of the application for a threshold duration of time, wherein the threshold duration of time is based on an amount of interaction between the user and the application. In some implementations, the automated assistant is unresponsive to the spoken utterance when the spoken utterance is provided by the user after the threshold duration of time and the selectable GUI element is no longer rendered at the display interface of the computing device.

In some implementations, determining that the assistant operation is compatible with the application that is executing at the computing device includes: determining that an additional selectable GUI element, which is being rendered at an application interface of the application, corresponds to an application operation that can be executed in response to initializing the assistant operation. In some implementations, wherein determining that the assistant operation is compatible with the application that is executing at the computing device includes: determining that the additional selectable GUI element includes a search icon or a search field, and the application operation corresponds to a search operation. In some implementations, wherein causing the automated assistant to control the application based on the assistant operation and the particular value for the parameter includes: causing, by the automated assistant, the application to provide search results that are based on the particular value for the parameter as specified in the spoken utterance from the user to the automated assistant.

In other implementations, a method implemented by one or more processors is set forth as including operations such as determining that a user has provided a first spoken utterance to an automated assistant that is accessible via a computing device, wherein the first spoken utterance includes a request to initialize an application that is separate from the automated assistant. The method can further include an operation of causing, in response to the first spoken utterance, the application to initialize and render an application interface in a foreground of a display interface of the computing device, wherein the application interface includes content that identifies an operation capable of being controlled via the automated assistant. The method can further include an operation of causing, based on the operation being controllable via the automated assistant, a selectable GUI element to be rendered over the application interface of the application, wherein the selectable GUI element includes a textual identifier or a graphical representation of the operation that can be controlled by the automated assistant. The method can further include an operation of determining that the user has provided a second spoken utterance to the automated assistant, wherein the second spoken utterance identifies a parameter that can be utilized by the application during execution of the operation, and wherein the second spoken utterance does not expressly identify the operation. The method can further include an operation of causing, in response to the second spoken utterance, the automated assistant to initialize performance of the operation, via the application, using the parameter identified in the second spoken utterance.

In some implementations, causing the selectable GUI element to be rendered over the application interface of the application includes: causing the textual identifier to be rendered with a command phrase that includes a term that identifies the operation and a blank space that indicates a user-identifiable parameter is omitted from the command phrase. In some implementations, the method can further include an operation of causing, based on the operation being controllable via the automated assistant, initializing an audio interface of the computing device for receiving a particular spoken utterance from the user, wherein, when the audio interface is initialized, the user can provide the particular spoken utterance for controlling the automated assistant without expressly identifying the automated assistant. In some implementations, causing the selectable GUI element to be rendered over the application interface of the application includes: generating content that is rendered with the selectable GUI element, wherein the content includes the graphical representation of the assistant operation that is selectable via a touch input to the display interface of the computing device.

In some implementations, causing the selectable GUI element to be rendered at the application interface of the application includes: causing the selectable GUI element to be rendered over the application interface of the application for a threshold duration of time, wherein the threshold duration of time is based on an amount of interaction between the user and the automated assistant since the selectable GUI element was rendered over the application interface. In some implementations, the automated assistant is unresponsive to an additional spoken utterance when the additional spoken utterance is provided by the user after the selectable GUI element is no longer rendered over the application interface. In some implementations, the method can further include an operation of causing, based on the operation being controllable via the automated assistant, an audio interface of the computing device to be initialized for detecting another spoken utterance that identifies one or more parameters for the operation.

In yet other implementations, a method implemented by one or more processors is set forth as including operations such as determining that an assistant operation is compatible with an application that is executing at a computing device, wherein the application is separate from an automated assistant that is accessible via the computing device. The method can further include an operation of causing, based on the assistant operation being compatible with the application, a selectable graphical user interface (GUI) element to be rendered at a display interface of the computing device, wherein the selectable GUI element identifies the assistant operation and is rendered in a foreground of the display interface of the computing device. The method can further include an operation of determining that a user has provided a spoken utterance that is directed to the automated assistant when the selectable GUI element is being rendered at the display interface of the computing device, wherein the spoken utterance specifies a particular value for a parameter of the assistant operation without expressly identifying the assistant operation. The method can further include an operation of causing, in response to the spoken utterance from the user, the automated assistant to control the application based on the assistant operation and the particular value for the parameter.

In some implementations, causing the selectable GUI element to be rendered at the display interface of the computing device includes: generating content that is rendered with the selectable GUI element, wherein the content includes an icon that is selected based on the assistant operation and is selectable via a touch input to the display interface of the computing device. In some implementations, causing the selectable GUI element to be rendered at the display interface of the computing device includes: generating content that is rendered with the selectable GUI element, wherein the content includes natural language content characterizing a partial command phrase that omits one or more parameters values for the assistant operation. In some implementations, determining that the assistant operation is compatible with the application that is executing at the computing device includes: determining that an additional selectable GUI element, which is being rendered by the application, controls an application operation that can be initialized by the automated assistant. In some implementations, causing the automated assistant to control the application based on the assistant operation and the particular value for the parameter includes: causing the application to render another application interface that is generated by the application based on the particular value for the parameter. In some implementations, causing the selectable GUI element to be rendered at a display interface of the computing device includes: causing the selectable GUI element to be rendered simultaneous to the application rendering one or more application GUI elements of the application.

We claim:

1. A method implemented by one or more processors, the method comprising:

determining that an assistant operation is compatible with an application that is executing at a computing device, wherein the application is separate from an automated assistant that is accessible via the computing device;

causing, based on the assistant operation being compatible with the application, a selectable element to be rendered at a display interface of the computing device, wherein the selectable element includes a textual identifier of the assistant operation, and a placeholder area indicating that the user can specify a parameter of the assistant operation;

detecting, by the automated assistant, a touch selection of the selectable element via the display interface of the computing device;

performing speech recognition on audio data that captures a spoken utterance that is received at an audio interface of the computing device after the touch selection of the selectable element, wherein the spoken utterance specifies a particular value for the parameter of the assistant operation without expressly identifying the assistant operation; and causing, in response to the spoken utterance, the automated assistant to control the application based on the assistant operation and the particular value for the parameter, wherein causing the automated assistant to use the assistant operation in controlling the application based on the assistant operation and the particular value is based on the touch selection of the selectable element and the selectable element including the textual identifier of the assistant operation, and wherein causing the assistant to use the particular value in controlling the application based on the assistant operation and the particular value is based on the spoken utterance specifying the particular value and being provided after the touch selection of the selectable element.

2. The method of claim 1, wherein causing the selectable element to be rendered at the display interface of the computing device includes:

causing the selectable element to be rendered over an application interface of the application for a threshold duration of time.

3. The method of claim 2, further comprising determining the threshold duration of time based on an amount of interaction between the user and the application.

4. The method of claim 3, wherein the automated assistant is unresponsive to the spoken utterance when the spoken utterance is provided by the user after the threshold duration of time and the selectable element is no longer rendered at the display interface of the computing device.

5. The method of claim 1, wherein determining that the assistant operation is compatible with the application that is executing at the computing device includes:

determining that an additional selectable element, which is being rendered at an application interface of the application, corresponds to an application operation that can be executed in response to initializing the assistant operation.

6. The method of claim 5, wherein determining that the assistant operation is compatible with the application that is executing at the computing device includes:

determining that the additional selectable element includes a search icon or a search field, and the application operation corresponds to a search operation.

7. The method of claim 6, wherein causing the automated assistant to control the application based on the assistant operation and the particular value for the parameter includes:

causing, by the automated assistant, the application to perform a search that is based on the particular value for the parameter as specified in the spoken utterance from the user to the automated assistant.

8. A method implemented by one or more processors, the method comprising:

determining that a user has provided a first spoken utterance to an automated assistant that is accessible via a computing device, wherein the first spoken utterance includes a request to initialize an application that is separate from the automated assistant;

causing, in response to the first spoken utterance, the application to initialize and render an application interface in a foreground of a display interface of the computing device, wherein the application interface includes content that identifies an operation capable of being controlled via the automated assistant;

causing, based on the operation being controllable via the automated assistant, a selectable element to be rendered at the display interface, wherein the selectable element includes a textual identifier of the operation, and a placeholder area indicating that the user can specify a parameter of the operation;

determining that the user has provided a touch selection of the selectable element followed by a second spoken utterance to the automated assistant, wherein the second spoken utterance identifies a particular value, for the parameter, that can be utilized by the application during execution of the operation, and wherein the second spoken utterance does not expressly identify the operation; and causing, in response to the second spoken utterance, the automated assistant to initialize performance of the operation, via the application, using the particular value identified in the second spoken utterance, wherein causing the automated assistant to use the particular value in initializing performance of the operation using the parameter is based on the touch selection of the selectable element and the selectable element including the textual identifier of the operation, and wherein causing the automated assistant to use the particular value in initializing performance of the operation using the parameter is based on the spoken utterance identifying the particular value and being provided following the touch selection of the selectable element.

9. The method of claim 8, wherein causing the selectable element to be rendered at the display interface includes causing the selectable element to be rendered over the application interface.

10. The method of claim 8, further comprising:
causing, based on the operation being controllable via the automated assistant, initializing an audio interface of the computing device for receiving a particular spoken utterance from the user,
wherein, when the audio interface is initialized, the user can provide the particular spoken utterance for controlling the automated assistant without expressly identifying the automated assistant.

11. The method of claim 8, wherein causing the selectable element to be rendered at the display interface includes:
causing the selectable element to be rendered simultaneous to the application rendering one or more application elements of the application.

12. The method of claim 8, wherein causing the selectable element to be rendered at the at the display interface:
causing the selectable element to be rendered over the application interface of the application for a threshold duration of time.

13. The method of claim 12, wherein the automated assistant is unresponsive to an additional spoken utterance when the additional spoken utterance is provided by the user after the selectable element is no longer rendered over the application interface.

14. A method implemented by one or more processors, the method comprising:
determining that an assistant operation is compatible with an application that is executing at a computing device,
wherein the application is separate from an automated assistant that is accessible via the computing device;
causing, based on the assistant operation being compatible with the application, a selectable element to be rendered at a display interface of the computing device,
wherein the selectable element includes a textual identifier of the assistant operation, and a placeholder area indicating that the user can specify a parameter of the assistant operation;
determining that a user has provided a spoken utterance that is directed to the automated assistant when the selectable element is being rendered at the display interface of the computing device,
wherein the spoken utterance specifies a particular value for the parameter of the assistant operation without expressly identifying the assistant operation;
determining that the particular value, specified in the spoken utterance, is associated with the parameter of the assistant operation identified by the selectable element being rendered in the foreground; and
causing, in response to the spoken utterance from the user and in response to determining that the particular value is associated with the parameter of the assistant operation identified by the selectable element, the automated assistant to control the application based on the assistant operation and the particular value for the parameter.

15. The method of claim 14, wherein determining that the assistant operation is compatible with the application that is executing at the computing device includes:
determining that an additional selectable element, which is being rendered by the application, controls an application operation that can be initialized by the automated assistant.

16. The method of claim 14, wherein causing the automated assistant to control the application based on the assistant operation and the particular value for the parameter includes:
causing the application to render another application interface that is generated by the application based on the particular value for the parameter.

17. The method of claim 14, wherein causing the selectable element to be rendered at a display interface of the computing device includes:
causing the selectable element to be rendered simultaneous to the application rendering one or more application elements of the application.

* * * * *